US007810731B2

(12) United States Patent
Johnson et al.

(10) Patent No.: US 7,810,731 B2
(45) Date of Patent: Oct. 12, 2010

(54) SYSTEM AND METHOD OF UTILIZING BARCODES

(75) Inventors: Neil Johnson, Woodstock, IL (US); Donald Schroeder, McHenry, IL (US); Philip Sylvester, Palatine, IL (US)

(73) Assignee: Fujifilm North America Corporation, Valhalla, NY (US)

( * ) Notice: Subject to any disclaimer, the term of this patent is extended or adjusted under 35 U.S.C. 154(b) by 0 days.

(21) Appl. No.: 12/473,590

(22) Filed: May 28, 2009

(65) Prior Publication Data

US 2009/0294540 A1 Dec. 3, 2009

Related U.S. Application Data

(60) Provisional application No. 61/056,729, filed on May 28, 2008.

(51) Int. Cl.

| | |
|---|---|
| ***G06F 17/00*** | (2006.01) |
| ***G06F 7/10*** | (2006.01) |
| ***G06K 7/10*** | (2006.01) |
| ***G06K 19/00*** | (2006.01) |
| ***G06K 15/00*** | (2006.01) |
| ***B41M 5/00*** | (2006.01) |
| ***B41F 33/00*** | (2006.01) |
| ***B41F 1/34*** | (2006.01) |
| ***H04N 1/00*** | (2006.01) |
| ***H04N 1/40*** | (2006.01) |

(52) U.S. Cl. .................. 235/462.13; 235/375; 235/376; 235/462.01; 235/487; 101/463.1; 101/483; 101/485; 358/1.6; 358/1.8; 358/1.18; 358/3.28; 358/3.29

(58) Field of Classification Search ......... 235/375–376, 235/462.01–462.49, 487; 101/463.1, 483, 101/485; 358/1.6, 1.8, 1.18, 3.28–3.29
See application file for complete search history.

(56) References Cited

OTHER PUBLICATIONS

Website Article; http://www.barcodeman.com/faq/2d.php; 2D Barcode FAQ; pp. 1-3.

Website Article; http://www.labelandnarrowweb.com/articles/2007/09/tlmi-packs-a-crowd-for-tech-007-conference.php; Online exclusive: TLMI packs a crowd for Tech 2007 conference; pp. 1-6.

Website Article; http://www.nela-usa.com/showcase_barcoding.php; Barcoding & Plate Sortation; pp. 1-4.

*Primary Examiner*—Michael G Lee
*Assistant Examiner*—Laura Gudorf
(74) *Attorney, Agent, or Firm*—Stroock & Stroock & Lavan LLP

(57) ABSTRACT

A system and method of monitoring a print manufacturing process which may include a raster image processor for imaging proofs, plates and press sheets for a printing press based on raster and vector data and generating a two-dimensional barcode where the data is translated into a homogenous messaging format, a plate imager for imaging a printing plate based on the data received from the raster image processor wherein the printing plate also comprises a two-dimensional barcode, a computer-to-plate device capable of transmitting the data from the raster image processor to the plate imager where the two-dimensional barcode is utilized to monitor the printing plate during the print manufacturing process and/or to image replacement printing plates.

17 Claims, 2 Drawing Sheets

100

SYSTEM AND METHOD OF UTILIZING BARCODES

CROSS-REFERENCE TO RELATED APPLICATION

This application claims the benefit of U.S. Provisional Application Ser. No. 61/056,729 filed May 28, 2008, entitled "SYSTEM AND METHOD OF UTILIZING BARCODES" the entire disclosure of which is incorporated by reference herein.

BACKGROUND OF THE INVENTION

1. Field of the Invention

The present invention relates generally to systems and methods for utilizing barcodes as part of the print manufacturing process and more particularly to a system and method that are able to manage and/or monitor a printing manufacturing process.

2. Description of Related Art

Over the past several years, the printing manufacturing industry has undergone numerous improvements resulting in improved printed products and services for consumers. Manufacturing printed items is somewhat unique within the realm of manufacturing and printing in that each printed job is typically customized or in other words each printed job has its own specific characteristics that are unique to that job. Additionally, throughout the process to produce the final printed goods most of the components used in the final manufacturing will be made specifically to meet the customer and job requirements. To create a printed product, typically a printing plate and a press color proof will be created during a pre-press phase and the plate and/or proof will then be sent to a location that has a printing press or other printing device to be used.

In the printing industry, the equipment used to manufacture and produce the printed products are generally standard devices made by a wide array of competitive vendors. As computers and databases have become more commonplace in the process, interprocess communication systems have been implemented to allow the sharing of data between the various portions of the process. This communication provides easy methods to track the material usage, production performance, costs, and to ensure and further enable systems of quality control.

Within the print industry much work has been done to attempt to standardize manufacturing communication between the disparate hardware used in the various portions of the overall printing process. Currently, most of this work is maintained by the CIP4 organization. Exemplar formats of communication formats include PPF (Print Production Format), JMF (Job Messaging format), and JDF (Job Description Format). Generally, these formats either act as part of serial point to point systems where data is only shared between a few points or require complex Management Information Systems (MIS) to act as a central repository for the manufacturing information. Implementation of these formats require dramatic modifications of the original equipment to enable exchange of these formats. In almost all situations each MIS and all direct cross system communication require specific development to enable successful communications. Prior art systems are limited however in that they are unable to track a print job throughout the manufacturing process and are limited in what information about the print job can accompany the print job or plate through the process.

Accordingly, a need exists for an improved system and method, particularly a system and method that are able to manage and monitor a printing manufacturing process in a way that enables communication between disparate systems that are a part of the manufacturing process or users who are overseeing the process. The embodiments of the present invention satisfy the foregoing, as well as other needs.

SUMMARY

Embodiments of the present invention satisfies the foregoing and other deficiencies in the art. According to an embodiment of the present invention, a computer-implemented method of monitoring a print manufacturing process is disclosed which comprises imaging a printing plate on a printing system to enable the imaging of the printing plate based on raster and vector data stored on the printing system, translating the data on the printing system into translated data having a homogenous messaging format, generating a two-dimensional barcode on the printing system wherein computer programming is stored on the printing system to enable the generation of the two-dimensional barcode which includes the translated data, determining an optimal location on the printing plate for the two-dimensional barcode, affixing the two-dimensional barcode to the printing plate and scanning the two-dimensional barcode to monitor the printing plate.

In one embodiment, a system for monitoring a print manufacturing process is disclosed that comprises a raster image processor including computer programming operative with memory to enable the imaging of a printing press based on raster and vector data and the generation of a two-dimensional barcode, a plate imager capable of imaging a printing plate based on the data received from the raster image processor wherein the printing plate also comprises a two-dimensional barcode, a computer-to-plate device capable of transmitting the data from the raster image processor to the plate imager, wherein the two-dimensional barcode is utilized to monitor the printing plate during the print manufacturing process.

BRIEF DESCRIPTION OF THE DRAWINGS

A further understanding of the present invention can be obtained by reference to the embodiments set forth in the illustrations of the accompanying drawings. The drawings are not intended to limit the scope of this invention, but merely to clarify and be illustrative of embodiments of the invention.

DETAILED DESCRIPTION OF CERTAIN EMBODIMENTS

In general, the present invention relates to systems and methods for monitoring the print manufacturing process. As described in greater detail below, and as will be appreciated by those skilled in the art, the various embodiments of the present invention provide methods and systems that dynamically monitor the print manufacturing process and efficiently overcome problems that may arise in connection with such process. Generally, in one embodiment of the present invention, the system and method are directed to the use of two-dimensional barcodes to communicate job specific data and/or process specific information to heterogeneous systems within a print manufacturing facility or across a print manufacturing process. Although the description below generally discusses two-dimensional barcodes and print manufacturing facilities it should be noted that it can apply to all heretofore known and hereafter developed coding technologies and can be used in other fields in addition to print manufacturing facilities.

Figure 1:
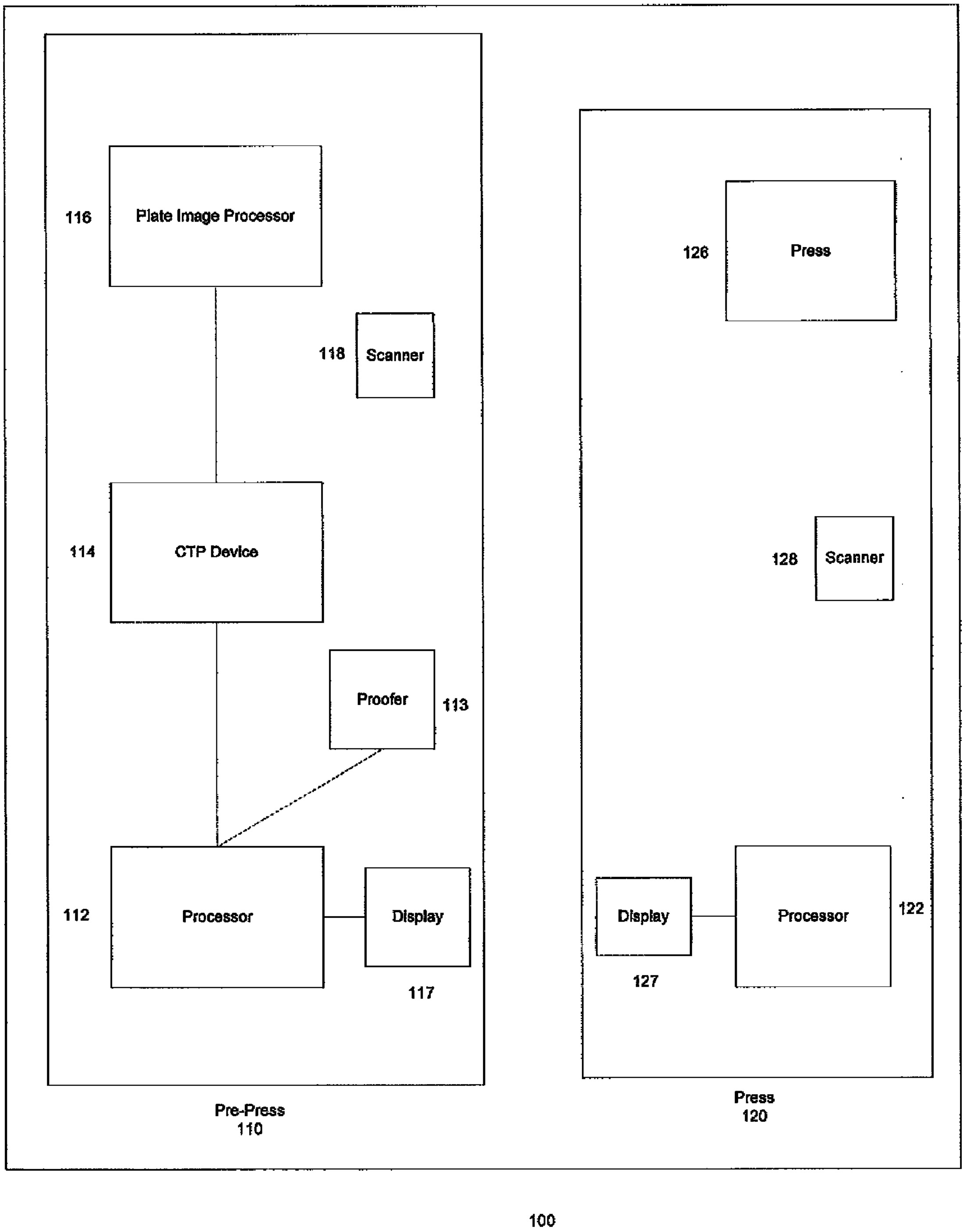
FIG. 1 is a schematic depicting a system according to one embodiment of the present invention.

Certain embodiments of the present invention will now be discussed with reference to the aforementioned figures, wherein like reference numerals refer to like components. Turning first to the schematic of FIG. 1, a print manufacturing system will be shown that utilizes a two-dimensional barcode in accordance with one embodiment of the present invention. As can be seen in FIG. 1, the pre-press portion 110 of a print manufacturing system 100 consists of a processor such as a raster image processor (RIP) 112 which preferably also has access to the internet, a computer-to-plate imaging device (CTP) 114, a proofer 113, a plate image processor, 116, a display 117 and a scanner 118. The press portion 120 of the printing proofing system 100 consists of a processor such as a Personal Computer (PC) 122 which preferably also has access to the internet, a scanner 128 and printing press 126.

It is to be understood that the present invention may be implemented utilizing any number of computer and printing technologies. For example, although the present embodiment relates to sharing data via the Internet, it may be utilized over any computer network, including, for example, a wide area network or local area network. Similarly, the processors 112, 116 and 122, although described as a RIP, image processor and PC respectively may be any computing device that may be coupled to the network, including, for example, personal digital assistants, web-enabled cellular telephones, hard-wired telephones that dial into the network, mobile computers, personal computers, Internet appliances, image processors and the like. As is known in the art, such computing devices include without limitation a processor, memory, RAM, ROM, software and/or hardware components. Likewise scanner 118 and 128 may be any scanning device or reader capable of reading a two-dimensional barcode or other coding technologies, such as a barcode scanner, camera, cellular telephone or other device.

A printing production pre-press workflow begins by converting vector and raster page information to raster data that is submitted to processor 112 and combined with layouts and configurations that are each then transmitted to a CTP device 114. As is known in the art, a raster is a rectangular grid of cells which cover an area. Each cell (or pixel) in a raster typically has a single numeric value assigned to it. That value can represent any number of attributes, for example the elevation of the cell at its center point or the color of a cell or any other value related to the image. As is known in the art, Vector data are one or more sets of coordinates which can delineate very precise areas and are typically used for discrete data which can be sorted into categories.

A user can view the data utilizing display 117. Before beginning a new printing manufacturing job, the job information (i.e. customer name, job id's) are manually entered by an operator or fed in from an MIS. Additionally, as part of these configurations the system operator typically makes decisions about the layout and configurations of the job either through manual entry or from an automatic setup from a MIS. Some of these decisions can include decisions related to page orientation, grouped layout, halftone screening and printing press (which will include size and press specific information). The pre-press workflow then produces numerous custom outputs in the form of printing proofs, press sheets or printing plates used on a printing press for producing the final printing of the job. A printing proof is a low volume output of the printing job to ensure the content, layout, and color accuracy of what the final printed job will produce. This printing proof which is generated by proofer 113 is usually given to the customer to approve the print job and to submit any comments or revisions thereto. Some examples of devices that generate printing proofs are Fujifilm FinalProof, Epson 4880, Remote Director monitor proofing solution, and Hewlett Packard 1050.

As part of the pre-press portion of the manufacturing process, once the data has been entered into the processor 112, the data is translated into JMF or other messaging format so that it can be consistently read regardless of which device created the plate or which press is using the plate. Once the data has been translated to a uniform messaging format, it is preferably stored on the processor 112 and/or uploaded via a network connection to a central server location or website where it can be viewed by a user of the job.

Thereafter, a two-dimensional barcode is generated utilizing barcode generating software at the processor 112, or other location, which barcode includes the data specific to the job. After being generated, the barcode is placed on the respective output from the job (e.g., proof or plate). Once the translated data and barcode have been generated, the data is transmitted via CTP device 114 to plate image processor 116 and a new plate is imaged. Additionally a proof can be generated by proofer 113. Once the plate has been imaged and/or proof generated, the two-dimensional barcode can be affixed to either or both outputs. In one embodiment of the invention, the matrix or two-dimensional barcode is automatically output as part of each plate, sheet or proof generated as part of this pre-press workflow. Additionally, as is known in the art, step wedge data which is an image output based on curve values can be imaged to the plate as well.

The two-dimensional barcode could include, for example (as discussed in more detail below), the known job information and the known process specific information or other related information that then could be later viewed easily by a customer, operator or user. Matrix or two-dimensional barcodes are a two-dimensional method of encoding information. Two-dimensional matrix codes typically encode data as dark or light cells within a regular polygonal matrix, accompanied by graphical finder, orientation, and reference structures. Two-dimensional barcodes provide for the encoding of much larger amounts of data within a single symbol and provide support for multi-byte character languages. Common two-dimensional barcode formats, include Aztec created by Handheld Products, Datamatrix created by Siemens, Maxicode created by UPS, QR Code created by Denso and PDF417 created by Symbol Technologies.

To address the communication between the various processes and hardware/software in the print manufacturing process and as the amount of data required in print manufacturing far exceeds the coding technologies commonly found in print manufacturing, the use of two-dimensional matrix barcodes solves these deficiencies by providing a unique way of managing and monitoring the print manufacturing process.

An example of translated data written and/or read from a barcode in CIP4 JMF format is shown below.

```
<?xml version="1.0" encoding="UTF-8"?>
<JMF SenderID="Raster Image Processor Name"
TimeStamp="2008-05-20 09:47:17"
xmlns="http://wwwCIP4org/JDFSchema_1_1">
<Signal ID="1" Type="Notification">
<NotificationFilter DeviceID="Printing Device Name
" JobID="Printing Job Name Goes Here"/>
```

-continued

```
<Notification Class="Information" Type="RipInfo"><RipInfo
ErrorID=
"1234567891011121314151617181920212223242526272829303132"/>
<RipInfo Name="Printing Job Name Goes Here"/>
<RipInfo User="Sample Customer Name"/><RipInfo
ColorTable="Output Profile Used"/>
</Notification>
</Signal>
</JMF>
```

As mentioned above, in one embodiment of the present invention, the two-dimensional matrix barcodes are used to encode print manufacturing data relating to a plate or proof. These barcodes or marks would include for example job referential information related to a proof such as customer name, job name, resolution, calibration information or date and time the proof was created. The barcode can then be affixed to the proof and any administrator who in the future comes into contact with such proof can immediately access all of this related information by decoding or scanning the attached barcode.

Alternatively or in addition to the proof barcode, a similar barcode can be output or generated for a printing plate or press sheet and can include for example data related to the customer name, job name, page, dot shape, lines per inch (LPI), a color identifier, printing press adjustment curve, imaging device adjustment curve, printing form information, consumable information, halftone screening information, calibration data, press dot gain, profile or date and time the press was created. The barcode can then be affixed to the printing plate or press sheet in a location that does not affect the printing but still enables a user to access the barcode to retrieve any of the information stored in the two-dimensional barcode.

Moreover, the barcode information can also be used to produce or reproduce an identical plate or proof if something happens to the originally imaged plate or proof (i.e. the plate breaks or malfunctions). In one embodiment, barcode data can also be used with a digital press such as a Xerox Igen or Hewlett Packard Indigo, for example, where the data can be stored internally within the digital press and a barcode can be printed onto the resulting output.

The data within the barcode or mark could be encoded simply as pure text in an xml format, standard JMF or JDF formats, or, if desired, the data could be encrypted to protect any sensitive information. Additionally, a user can scan the two-dimensional barcode on a proof and use the data to create additional identical proofs. The proof created will be identical to the one scanned, as all data required that normally requires selection and manual re-entry is automatically read from the barcode and can be transmitted to any system. In other words, two-dimensional barcode data is scanned to retrieve job specific data and populate subsequent processes that would normally require manual entry of this information. This greatly reduces human interaction with the process and human error that can detrimentally affect the process.

For quality control purposes, once the plate has been imaged, it is then inspected to ensure its quality and accuracy. While in prior art systems this would need to be done manually, in the present embodiment, the plate can be automatically inspected using a high resolution digital camera, video capture system or similar device. An image of the output plate is captured using one of these devices and the barcode is scanned. The data from the barcode is then compared to the captured image using a binary comparison or other digital image comparison and if the captured data matches the stored data the plate is approved, if not, the plate will need to be reimaged.

Once the plate has been imaged and properly inspected, the barcode can be scanned using scanner 118 and the plate sent to the press where it is to be used. Additionally a proof can be generated by proofer 113 and a barcode affixed to the proof or generated thereon. By scanning the barcode, the operators at the pre-press location have all the data about the plate or proof before it is sent out and can access that information if it is ever needed. In prior art systems, an operator would only write two or three lines of information about the plate, with a written document in the job jacket or handwritten data on the job ticket and this handwritten information was all the information about the plate that was available.

After being properly imaged and scanned, the proof and/or plate are then sent to the user as part of the press phase. Once a proof is delivered to a user, data about this job can be automatically retrieved from the pre-press workflow or the quality control system by scanning the attached barcode. In one embodiment, scanning the two-dimensional barcode automatically opens a web based quality control system that monitors measurement details of the proof. This not only relieves the burden of manually searching for this information, it also guarantees the correct selection. This is especially useful in a print job since in a print job many pages may be similar, or a different version with only minor changes. The use of two-dimensional barcoding in a printing system can be incorporated into a plethora of existing print systems to enable better interaction and more precise production of print jobs. One such printing system is disclosed in detail in U.S. Pat. No. 7,528,981 entitled "System and Method for Remote Monitoring of Print Systems" and assigned to the same assignee of the present application, the contents of which are hereby incorporated by reference in their entirety.

At the press stage, the plate is placed on the press 126 where it can be used for print manufacturing. Preferably, the operator scans the two-dimensional barcode on the plate using scanner 128 and the data from the barcode is stored on processor 122 where it can be viewed on display 127 as well as used by press 126. In prior art systems, the user of the press (which may be in another physical location of the same building or a different building entirely) would need to re-enter all of the job information at this stage to ensure the plate and press were compatible and the job was processed properly. Through use of the barcode according to one embodiment of the present invention, manual entry is no longer necessary as all hardware and software on both the pre-press and press sides can interact through the barcoded data. Additionally, the user on the press side can access the website where the data was previously uploaded at the pre-press stage and view data related to the plate to ensure it meets the required specification. Moreover, once the barcode has been affixed to the plate or in the alternative to a proof, a customer can scan the barcode using scanner 128 which if properly configured (e.g., has access to a network) will allow the user to access the website directly. Thus, if a customer or operator is viewing a proof and requires additional information related to the proof they can scan the barcode and review the information related thereto. Additionally, it is not necessary for a user at the press stage to know how the plate he or she is using was imaged or what hardware was used to image the plate. Rather, all the necessary information related to the plate is stored in the two-dimensional barcode and is readily accessible to anyone who scans such barcode.

An additional benefit of using a two-dimensional barcode is in the quality control process carried out to ensure color accuracy. In the past, at the pre-press stage, users would have to enter all the same job specific information previously entered to produce the proof to test for quality control. Automatic entry of this information reduces the operators work required, and ensures consistent and accurate information. Additionally as the multiple systems across the print manufacturing process now have identical data sets (from the barcode) the cross referencing of these systems by other systems becomes possible as the data between them is identical (no misspellings, inaccurate entry, missing data, etc). Quality control systems in the print manufacturing field have progressed to the point whereby the systems automatically read printing plates both in the measurement of the reference patch information and to ensure the content is correct. The two-dimensional barcodes provide the machine-readable data for the job which can be sent to processor 112 and compared with the output printing plate.

For example, job information can be retrieved as the press adjustment curve applied to the plate to compare such information with the data scanned from the target patches on the plate. In another example, the raster image or job data can be retrieved to be compared to the output plate for automatic machine inspection. As the data defined within the barcode is the same as what the pre-press workflow system generates, any errors defined in quality control could be sent back to the workflow system for further action. For instance, if an error is detected, output could be automatically stopped to reduce waste and stop or hold further incorrect output until the error is corrected should the user deem this necessary.

Once the plate is placed on the press 126, the two-dimensional barcode can be further used for a variety of purposes. For instance, the retrieval of the encoded information on the plate via scanner 128 can be used to transfer accurate job specific information to a press control system. In the past, these systems could only have the data populated by manual user entry or as data from a connected MIS. Typically, the data entered was very limited (users enter the smallest information possible) and in many cases not wholly accurate or in the proper format which renders the data within these systems difficult if not impossible to use for cross connecting data sets across the printing system. In another example, regeneration of a replacement plate can be requested using the data retrieved from the two-dimensional barcode. In current systems, a damaged or worn plate replacement would require a press operator to physically return to the pre-press area to request a pre-press familiar operator to reproduce the required plate. As the production of the printing plate is itself a custom manufacturing process, many errors can occur if the exact processes originally used are not followed for the replacement. The two-dimensional barcode can include the required data sets to automate the process of reproducing the plate from pre press processor 112. Using a two-dimensional code, a user could easily scan the two-dimensional barcode to reorder the exact replacement plate from the pre-press workflow 110.

Figure 2:
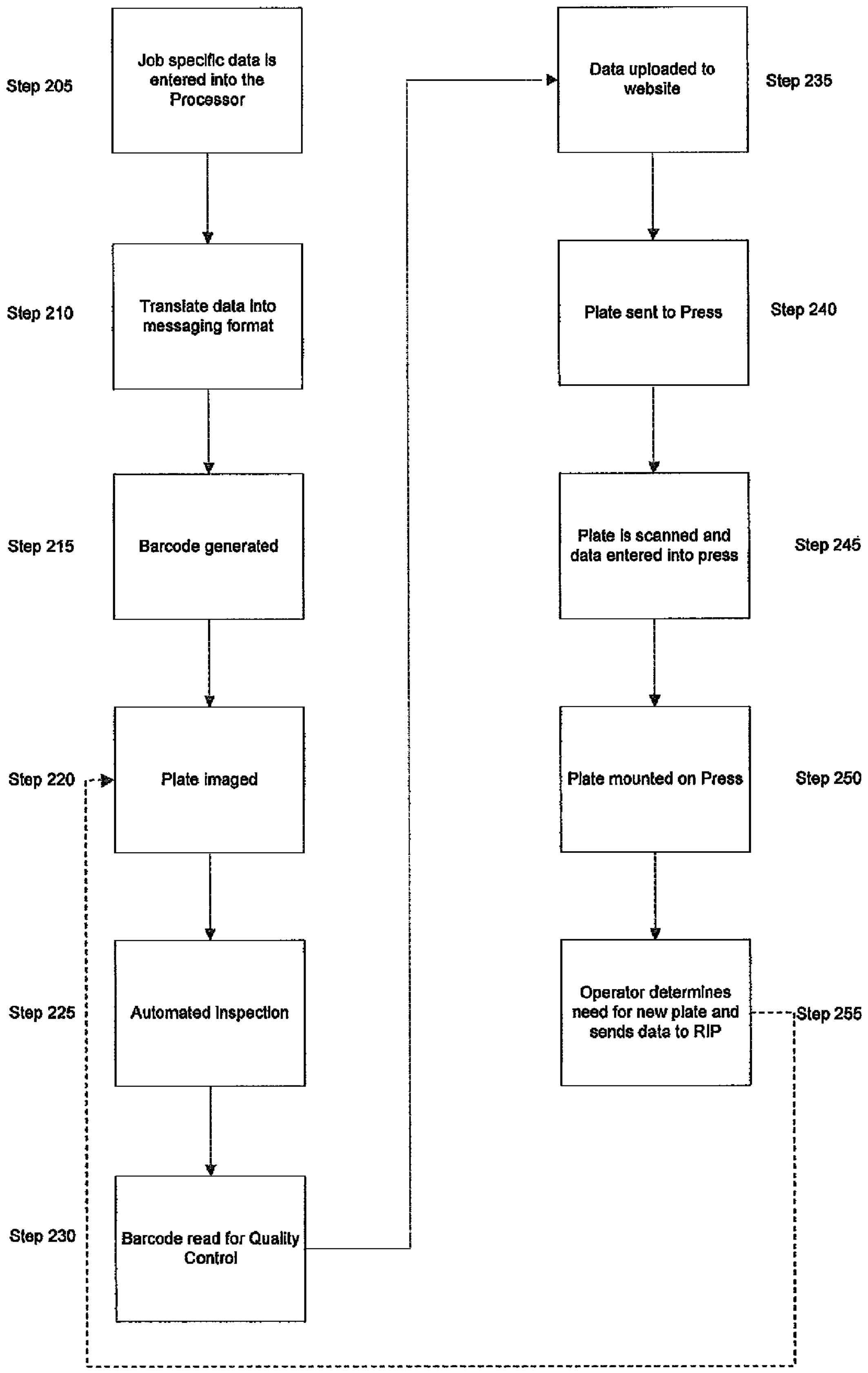
FIG. 2 is a flowchart depicting a method according to one embodiment of the present invention.

A method of monitoring and managing the printing manufacturing process will now be further described with reference to FIG. 2. First, data regarding the job, which can include raster and vector data are entered into processor 112. Step 205. This data can either be entered in manually or automatically via any heretofore or hereafter developed means included the use of an MIS system. The data regarding the job should be sufficient to enable processor 112 to utilize a CTP to image a printing plate for the job. Once the data has been entered into the processor, it is translated to a messaging format such as JMF to allow intercommunication between disparate components of printing system 100. Step 210. Once the data has been translated, a barcode creation utility is employed to generate a two-dimensional barcode within processor 112. Step 215. This barcode can either be imaged directly upon the printing plate or generated as a separate tag that can be affixed to the plate, job jacket or job ticket.

Next, the translated data is transmitted to the CTP device 114 which images the plate in accordance with the specifications and is sent through plate processor 116 of the job received from the processor 112. Step 220. At that point, if the barcode had been generated as a separate tag, the barcode can be scanned and the data stored at processor 112 in case the data is needed later to order a remake of the plate for example, and affixed to the printing plate. In one embodiment, once the plate has been imaged, the plate is automatically inspected to ensure that the plate's measurements are correct by using a high resolution digital camera, video capture system or similar device. Step 225. To effectuate this inspection, an image of the outputted plate is captured using one of these devices and the barcode is scanned. The data from the barcode is then automatically compared to the captured image and if the data matches the plate is approved, if not, the plate may need to be reimaged. If the plate's inspection reveals no errors the operator who is charged with quality control management scans the barcode and confirms that the plate conforms with the standards for the job. Step 230. Additionally, the data can be uploaded to a website which can be accessed by the eventual end user of the printing plate. Step 235. This data can be used as part of any network based monitoring of print systems or web based system such as those disclosed in detail in U.S. Pat. No. 7,528,981 entitled "System and Method for Remote Monitoring of Print Systems."

Once all of the quality control procedures and inspections have been completed, the plate is sent to the printing press room where it is to be used. Step 240. Alternatively, in lieu of a plate, a proof can be generated initially by proofer 113 and sent to the press room as a way of confirming that the printed product is accurate for the job being produced. As with the plate, the proof can contain a two-dimensional barcode which allows the user to track the proof and have access to information about the plate and job that created the proof. If corrections are needed, they can be communicated back to the pre-press room from processor 122 where they can be implemented and a new proof generated. When the plate arrives in the press room, the press room operator can scan the barcode using scanner 128 which will automatically import the job specific data into the press. Step 245. Next, the plate is mounted on the press to enable the creation of the printed product. Step 250.

If in the course of creating the printed product, an error occurs or any distinction between the printed product and the proof is noticed by the press room operator, the press room operator can easily access all of the related job data on processor 122 on display 127 based on the scan of the barcode. If it is determined that there is a defect in the plate or that the plate has deteriorated for whatever reason, the data about the plate and job can be automatically forwarded from processor 122 to a prepress operator processor 112 where a new plate identical to the first plate can be imaged. Step 255. Alternatively, if certain of the information from the job needs to be changed, the operator can revise that information from processor 122 and send the request for a revised plate to the pre press operator processor 112 where a new or revised plated can be imaged. It should be noted that the ability to allow all of the components and human operators that are part of the print process to communicate with each other in such a seamless manner reduces human error and other related issues that arise in the current method.

Those skilled in the art will recognize that the method and system of the present invention has many applications, may be implemented in many manners and, as such is not to be limited by the foregoing embodiments and examples. In other words, functional elements being performed by a single or multiple components, in various combinations of hardware and software, and individual functions can be distributed among software applications at either the client or server level. In this regard, any number of the features of the different embodiments described herein may be combined into one single embodiment and alternate embodiments having fewer than or more than all of the features herein described are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present invention covers conventionally known and features of those variations and modifications through the system component described herein as would be understood by those skilled in the art. It is the intention, therefore, to be limited only as indicated by the scope of the claims appended hereto.

It is also to be understood that the following claims are intended to cover all of the generic and specific features of the invention herein described and all statements of the scope of the invention, which, as a matter of language, might be said to fall therebetween.

The invention claimed is:

1. A computer-implemented method of monitoring a print manufacturing process comprising:

imaging a printing plate on a printing system based on raster and vector data stored on the printing system;

translating the data on the printing system into translated data having a homogenous messaging format;

generating a two-dimensional barcode on the printing system wherein computer programming is stored on the printing system to enable the generation of the two-dimensional barcode which includes the translated data;

determining an optimal location on the printing plate for the two-dimensional barcode;

affixing the two-dimensional barcode to the printing plate; and scanning the two-dimensional barcode to monitor the printing plate.

2. The method of claim 1 further comprising:

uploading the data from the two-dimensional barcode to a website.

3. The method of claim 1 wherein the messaging format is Job Messaging Format.

4. The method of claim 1 further comprising:

installing the printing plate on a printing press;

importing the data from the two-dimensional barcode to the printing press; and monitoring the printing plate at the printing press location.

5. The method of claim 1 further comprising:

generating a proof from the printing plate wherein the proof comprises a two-dimensional barcode.

6. The method of claim 5 further comprising scanning the proof's two-dimensional barcode to retrieve data related to the proof and the printing plate used to generate the proof.

7. The method of claim 1 further comprising inspecting the plate on the printing system by comparing the translated data in the two-dimensional barcode with the data stored on the printing system.

8. The method of claim 1 further comprising imaging replacement printing plates based on the translated data in the two-dimensional barcode.

9. A system for monitoring a print manufacturing process comprising:

a raster image processor including computer programming operative with memory for imaging of a printing press based on raster and vector data and generation of a two-dimensional barcode;

a plate imager for imaging a printing plate based on the data received from the raster image processor wherein the printing plate also comprises a two-dimensional barcode;

a computer-to-plate device for transmitting the data from the raster image processor to the plate imager;

wherein the two-dimensional barcode is utilized to monitor the printing plate during the print manufacturing process.

10. The system of claim 9 further comprising:

a display in communication with the raster image processor for displaying data related to the print manufacturing process.

11. The system of claim 9 further comprising an inspection apparatus for retrieving information from the printing plate and comparing the information with data stored on the raster image processor.

12. The system of claim 9 wherein the raster image processor further includes computer programming for translation of the data into a homogenous messaging format.

13. The system of claim 12 wherein the messaging format is Job Messaging Format.

14. The system of claim 9 further comprising a proofer for generating a low volume output of a printed product to be generated by the printing plate.

15. The system of claim 14 wherein the low volume output comprises a two-dimensional barcode.

16. The system of claim 9 further comprising a printing press for use with the printing plate wherein the printing press includes computer programming to enable the printing press to import data from the two-dimensional barcode.

17. The system of claim 9 wherein the two-dimensional barcode is further utilized to image replacement printing plates.

* * * * *